Figure 1:
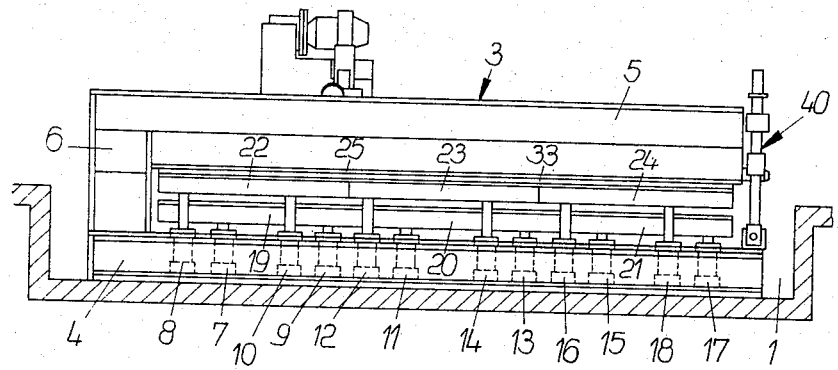

April 9, 1968

S. HAHNE 3,377,013

PROCESS AND DEVICE FOR WELDING SEAMS

Filed April 22, 1966

United States Patent Office 3,377,013
Patented Apr. 9, 1968

3,377,013
PROCESS AND DEVICE FOR WELDING SEAMS
Siegfried Hahne, Rheinkamp-Baerl, Germany, assignor to Messer Griesheim GmbH, Frankfurt am Main, Germany, a corporation of Germany
Filed Apr. 22, 1966, Ser. No. 544,612
Claims priority, application Germany, Jan. 19, 1966, M 68,058
9 Claims. (Cl. 228—44)

The invention relates to a process for automatic welding of the longitudinal seam of a length of pipe and to a device for carrying out this process.

In the processes and devices of this type it is important to set up the prerolled length of pipe in the end position with respect to the seam and then to weld along the seam. In welding by hand a wide variety of undifficult ways are possible. However, with automatic welding, because the guiding agents required for automatic control of the welding torch, additional area is needed than compared to manual welding. Thus automatic welding has a considerably greater space requirement. In a known device of the above-named type, the length of pipe is clamped with the longitudinal seam upwards and then the seam is welded from above. The welding torch is conducted along the length of pipe on the outside, so that there is sufficient space for the necessary welding torch guiding agents. In this known device, however, an expensive platform is required if lengths of pipe with large diameters are to be handled. The height at which welding takes place in this known device depends on the diameter of the finished pipe. If pipes of various diameters are to be processed with this device, the platform, on which the welding torch is conducted, must be vertically adjustable. Alternatively the pipe supports must be vertically adjustable to compensate for the diameter differences. This requires a considerable expense and a significant space requirement. It is also particularly disadvantageous in that the dimensions of the device must correspond to the largest length of pipe, i.e., thereby requiring correspondingly strong foundations and frame parts, which are not only costly but are also bulky. Moreover these stronger and bulkier parts are not required for the welding of small pieces of pipe and frequently obstruct the desired automatic treatment.

An object of this invention is to provide a process and a device of the above type of such a construction that lengths of pipe of various diameters can be processed with the simplest means without requiring expensive adjustable framework.

The novel process is characterized in that the length of pipe is clamped with the seam downwards and is welded from inside. According to the invention, the welding proceeds always down the length of pipe. Consequently, the height position of the torch is independent of the diameter of the pipe and is determined solely by the support surface. Accordingly height adjustments for fitting to the diameter of the length of pipe are not necessary. The welding can proceed without difficulty at floor level or in the proximity of the floor surface, so that the work process of the automatically run welding torch can be comfortably observed by a standing or sitting person from one end of the length of pipe. It is also not necessary for such observation purposes, to arrange a special turnable platform, even if lengths of tube of several meters diameter are being welded.

A device for performing this process is inventively characterized in that the lower jaws of its clamping device (directed upwards) are mounted with a straight downward support, while the upper jaws (directed downwards) are mounted directly above on a crosspiece, with the welding torch guide being provided at the crosspiece within the pipe.

The invention makes use of the fact that with modern techniques in this field it is now possible to construct these guiding means very narrowly so that even the crosspiece can be constructed narrow enough to be inserted in a tube of a small diameter. Conversely lengths of pipe with very large diameters can also be effectively processed. The use of the device is limited only by stability and the appearing weights.

The lower jaws of the device are effectively mounted with provision for height adjustment and are driven by an elevating mechanism toward and away from the upper jaws. In operation the seam edges of the length of pipe are inserted between the opened jaws. The lower jaws are then driven against the upper jaws until the length of tube is firmly clamped in. The upper jaws can be attached permanently to the fixed crosspiece since vertical movement of only the lower jaws is necessary to effect a closing or clamping.

In many instances, it is desirable to perform the welding above floor level. If powerful hoisting or lifting units are used, they are sunk into the floor so that welding takes place at the desired level of height. When speaking of floor level, both here and later, the level of a work surface is meant. This level can relate to not only the floor of an assembly room, but also to the work surface of a welding machine.

A preferred embodiment of the invention is characterized in that a first set of lower jaws is provided for the one seam and a second set of lower jaws is provided for the other seam of the tube or pipe. The lower jaws of each set are moved in common with each other but independently of those of the other set. This is accomplished simply in that a special lifting mechanism is provided for the lower jaws of each set. If the lower jaws of both sets are lined tightly along the seam, then the length of pipe can be clamped in and adjusted in a very simple manner by for example closing the first set of jaws while the other set is open. There is then a free space or interstice over the open lower jaws of the second set between which the one seam edge of the length of pipe can be inserted specifically up to a point where it hits the closed lower jaws of the other set. When the seam edge has taken this position, then the lower jaws previously opened are closed against its corresponding upper jaws and the inserted seam edge is thus clamped in. Next the lower jaws of the first set can be opened so that the other seam edge can be pushed in to a point until it hits the already clamped in seam edge. The first set is again closed or pressed against its corresponding upper jaws. The length of pipe is thus clamped in with the seam edge located at the height between the two lower jaw rows. Both seam edges are accordingly parallel against each other. If a welding aperture or slot is desired, then the same process can be used, with however spacing holders being inserted to hold the seam edges apart from each other.

The upper jaws can be continuous in that a single upper jaw is provided for each set of lower jaws. The upper jaws are spaced from each other in the area of welding seam where the welding can proceed. This slot can extend along the line on which both sets of lower jaws are spaced from each other.

Figure 2:
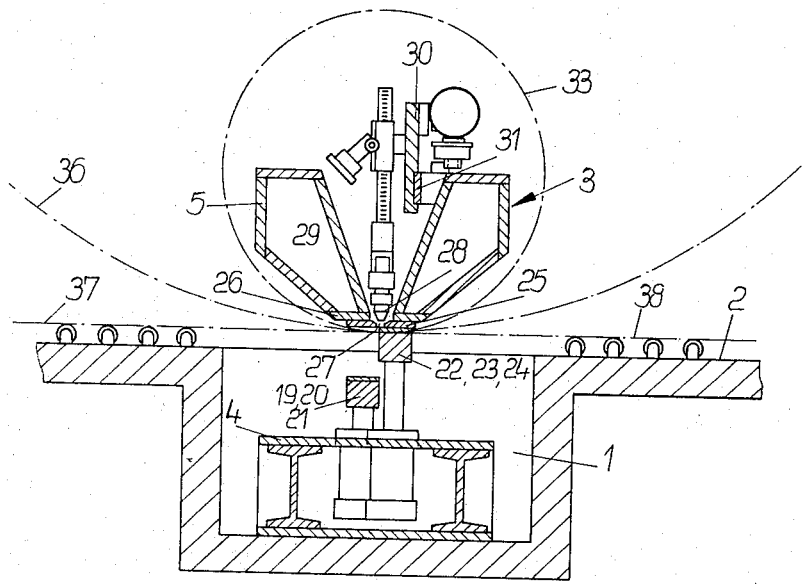

The invention is described in more detail by means of the attached drawing wherein:

FIGURE 1 is a side elevaton view in section of one embodiment of this invention; and FIGURE 2 is an end elevation view in section of the embodiment of the invention shown in FIGURE 1.

In the drawing a pit 1 is set into floor 2 of a workshop. The automatic welding machine 3 is set into this pit 1.

The automatic welding machine 3 consists of a lower part 4 and crosspiece 5. Crosspiece 5 is attached on the one side to part 4 by a support 6 and on the other side by a detachable clamping device 40. A hoisting device with several lifting mechanisms 7 through 18 is provided in the lower part 4. Lifting mechanisms 7 through 18 are, for example, hydraulically driven hoisting cylinders. The lifting mechanisms 7 and 9 control or drive a lower jaw 19, lifting mechanisms 11 and 13 drive lower jaw 20, lifting mechanisms 15 and 17 drive lower jaw 21, lifting mechanisms 8 and 10 drive lower jaw 22, lifting mechanisms 12 and 14 drive lower jaw 23, and lifting mechanisms 16 and 18 drive lower jaw 24. Lower jaws 19, 20 and 21 are aligned in a row and comprise a set. Lower jaws 22, 23 and 24 are also aligned closely parallel thereto in a row. In FIGURE 2 only lower jaws 19 and 22 are visible since the remaining lower jaws are behind jaws 19 or 22.

Above lower jaws 19 to 24 upper jaws 25, 26 extend along the entire length of the lower jaws. Upper jaws 25, 26 are fixed to the stationary crosspiece 5 and spaced from each other by open slot 27 which extends along the entire length of the jaws and in which the welding takes place. In this slot 27 projects the torch nozzle 28 of a welding torch 29 which is vertically adjustable and is arranged on a torch carriage 30. The torch carriage 30 can be moved horizontally along crosspiece 5 by rail guiding system 31.

The machine is operated as follows: the hoisting mechanisms of the set of jaws located at left in FIGURE 2 are switched on so that these jaws are pressed upwards against the upper jaw 25. The other lifting mechanisms are switched off, so that the lower jaws take their lowest position on the other side. In the interstice or space between upper jaw 26 and pulled-back or open lower jaws lying thereunder, a seam edge of a length of pipe 33 is inserted until the seam edge hits jaws 22 through 24. When this happens, hoisting mechanisms 7, 9, 11, 13, 15 and 17 are switched on and the corresponding jaws grasp the seam edge and press it against upper jaw 26. The other hoisting mechanisms are now switched off so that the corresponding lower jaws retreat to their lower position. Now the other seam edge is pushed under upper jaw 25 until the seam edge hits against the already clamped seam edge or a spacing holder inserted between. Next the remaining lifting mechanisms are switched on so that the other seam edge is also clamped. At this point it should be pointed out that the length of pipe 33 can be brought into this clamped position both from the two sides as well as from the front over the crosspiece 5. In the latter case for the reversing of the position of the curved length of pipe 33 the clamping device 40 must be released and swung out of the way. Before the jaws are set up, the clamping device 40 is then brought again into the shown position and crosspiece 5 is clamped to device 40 so that the upper jaws 25, 26 are again supported.

When the length of tube is clamped in, the welding can be carried out starting from one end and continuing to the other end. The welding proceeds by automatic guidance of the welding torch 29 along slot 27.

When the welding is completed, lifting mechanisms 7 through 18 are released. Clamping mechanism 40 is also released and is moved to the side away from crosspiece 5, i.e., with reference to FIGURE 1, from left to right.

As indicated in FIGURE 2, instead of the very small length of pipe 33, larger lengths of pipe (shown by phantom line 36) can also be processed in the same manner. This can be done because it is not necessary to have the parts being used in the welding, fitted to the diameter of the length of pipe to be processed.

In a corresponding manner, even flat sheets can be welded one to the other as indicated by the dotted lines 37, 38.

What is claimed is:

1. A device for the automatic welding of a longitudinal seam, characterized in clamping means for holding the seam edges, said clamping means including a crosspiece adapted to be positioned above the seam edges, upper clamping jaw means mounted on said crosspiece, lower clamping jaw means for moving toward said upper jaw means to lock the seam edges therebetween, welding means, and guide means on said crosspiece for moving said welding means over said seam edges.

2. A device according to claim 1 wherein said lower jaw means comprises a plurality of lower jaws, and lifting means for vertically moving said jaws.

3. A device according to claim 2 wherein said upper jaw means comprises a pair of upper jaws rigidly mounted on said crosspiece.

4. A device according to claim 2 wherein said lifting means is disposed below floor level.

5. A device according to claim 2 wherein said plurality of lower jaws comprises two sets of lower jaws, each of said sets being arranged to be disposed under a seam edge.

6. A device according to claim 5 wherein all of the jaws in each set are movable in common, and said sets being movable independently of each other.

7. A device according to claim 5 wherein a hoisting mechanism is provided for each of said sets.

8. A device according to claim 5 wherein said sets are disposed close to the seam edges to serve as a welding bath guarantee.

9. A device according to claim 2 wherein said upper jaw means comprises a pair of upper jaws mounted on said crosspiece, said upper jaws being spaced from each other to form a slot above the seam.

No references cited.

RICHARD H. EANES, JR., *Primary Examiner.*